B. BARLOW.
PLANT BOX.
APPLICATION FILED JAN. 17, 1919.
1,305,434.
Patented June 3, 1919.
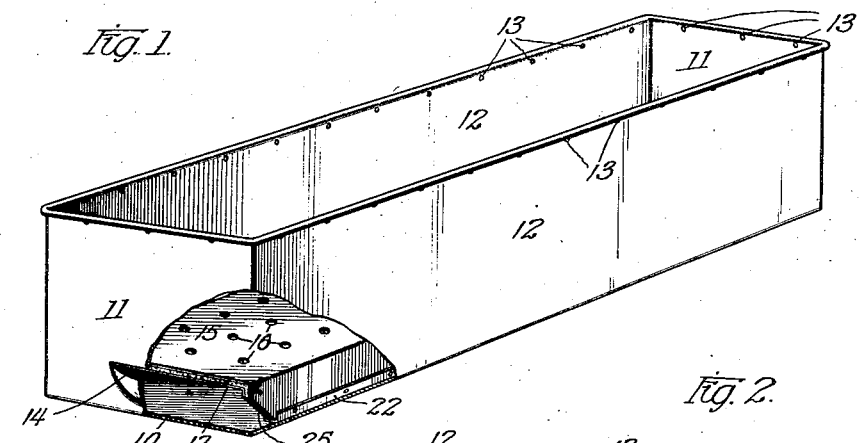
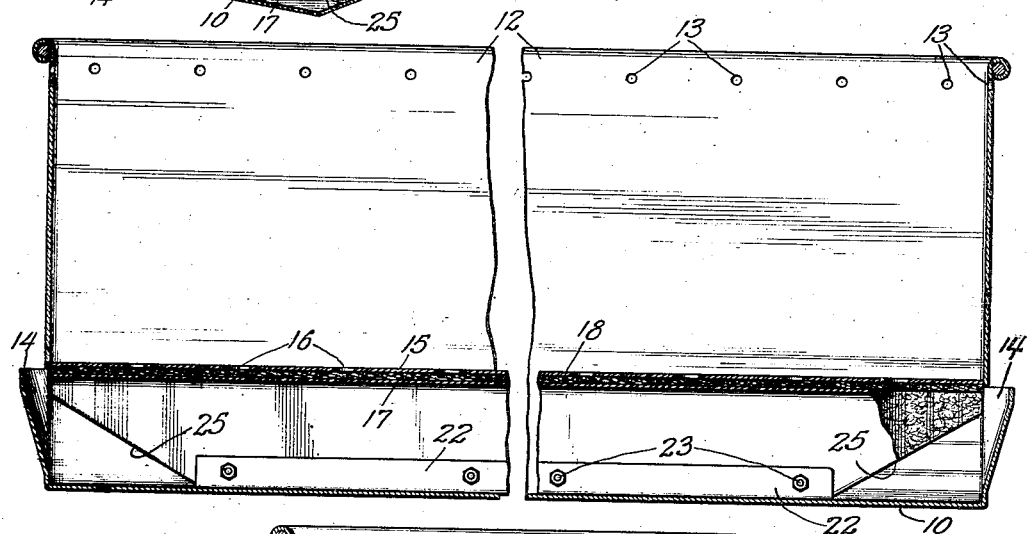
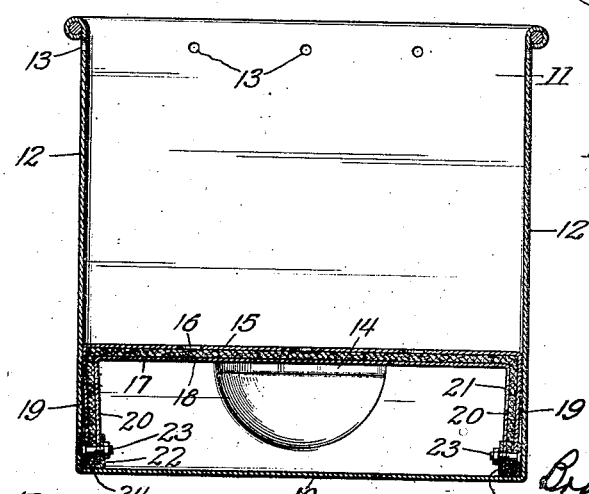
WITNESSES:
Robert H. Weir
Arthur W. Parkops
INVENTOR
Bronson Barlow
BY Chas. F. Murray
ATTORNEY

UNITED STATES PATENT OFFICE.

BRONSON BARLOW, OF CHICAGO, ILLINOIS.

PLANT-BOX.

1,305,434.  Specification of Letters Patent.  Patented June 3, 1919.

Application filed January 17, 1919. Serial No. 271,651.

*To all whom it may concern:*

Be it known that I, BRONSON BARLOW, a citizen of the United States, and resident of Chicago, in the county of Cook and State of Illinois, have invented certain new and useful Improvements in Plant-Boxes, of which the following is a specification.

My invention relates to plant boxes and particularly to a novel self-watering device of the character described.

One of the objects of this invention is to provide a device which is adapted for use in the usual manner, as on window sills or brackets, or by being suspended, and in which unusual provisions are made for supplying water to the soil contained therein. In an article of this character it is essential that moisture be supplied only to the extent required by the growing plants, and to furnish the correct amount at all times is difficult when it must be supplied to the surface and at varying intervals of time.

In my construction the correct amount of water to compensate for evaporation and transpiration by the growing plants is at all times made certain, this for the reason that provision is made for maintaining a body of water in the lowermost part of the box, the water being out of contact with the soil and being supplied to the soil by capillary action. Furthermore, means are provided for supplying the water directly to this container as well as for furnishing it to the surface of the soil. This feature provides an added advantage in that the water contained in the space beneath the soil is in open communication with the atmosphere and is therefore aerated and is subject to direct inspection at all times to determine its level.

The invention will be more readily understood by reference to the accompanying drawings, wherein, Figure 1 is a perspective view of a box constructed in accordance with my invention, a portion of one end thereof being broken away to disclose the construction of the bridge wall;

Fig. 2 is a longitudinal, vertical section through the box, (the view being considerably enlarged), and, Fig. 3 is a transverse, vertical section therethrough.

In the drawings it will be seen that the box comprises a bottom wall 10, end walls 11, and side walls 12. The upper, marginal edges of the side and end walls may be reinforced in the usual manner and provided with a plurality of apertures 13, which may be utilized for the attachment of suspending devices, or for the wires of a trellis.

The end walls 11, are at a point near their lower ends, slitted and arched outward to form lips 14, which serve as water-supply openings and for the circulation of air over the surface of the water which may be contained in the lower portion of the box. They may serve also as over-flow openings in event an excess of water is supplied.

The soil within the box is adapted to be supported upon a bridge, which, as shown, may be of a plurality of spaced perforations 16, therein, a lower imperforate sheet 17, of metal, and an intermediate sheet 18, of asbestos or similar material having capillary capacity. Asbestos is preferred for the reason that it is an inorganic material and is not subject to decay or deterioration as is the case with organic substances such as cotton fabrics or sponge. Furthermore, it will take up only capillary water and not free water, as in the case of the sponge. The side margins 19, of the upper sheet of metal are bent downwardly at right angles and, together with the marginal edges 20, of the inner sheet of metal, act as supporting devices for the bridge wall. The intermediate sheet of asbestos is likewise provided with downturned marginal edges 21, which extend to substantially the bottom of the box. As a means for binding the edges I may provide the U-shaped strip 22, and secure all the parts together by bolts 23. In case the binding strip is employed, I provide a plurality of openings 24, in the lower edge thereof, in order that water may have no difficulty in passing to the asbestos sheet. In order to assist in inserting and removing the bridge wall, I prefer to cut off the ends of the depending laminated portions as indicated at 25.

In operation, the parts being assembled as shown, soil is placed in the box and a quantity of water supplied to the space beneath the bridge wall. This water is taken up by the asbestos sheet and permeates the whole body thereof. The soil supported by the bridge wall, being in contact with the asbestos through the perforations 16, will absorb the water by capillary attraction, as required. By direct vision it can be ascertained when the level of water in the container is lowered and an additional quantity may be supplied through the lipped end openings.

It will be noted that the plants cannot be drowned with an excess of water as any free water will pass by gravity into the space beneath the bridge wall. An abundant and self-regulating supply of capillary water is constantly fed to the soil and to the roots, however slowly or rapidly it may be absorbed, to supply evaporation from the soil or transpiration by the growing plants. This results from the high capillary capacity of the fabricated asbestos and from the extensive contact by the asbestos with the free water in the reservoir and with the soil above. The perforations in the upper sheet of the bridge can be as small and close together as desired, assuring a surface of capillary contact with the soil in excess of any requirements of the growing plants, yet not resulting in the presence of free soil water but only capillary water.

The water in the reservoir is constantly and automatically aerated, being in contact at all times with the atmospheric air over its whole surface. This prevents stagnation and keeps the water always sweet and near the temperature of the surrounding air.

The construction makes possible any depth of reservoir and any volume of water desired. Water is found to rise in a single dry sheet of such asbestos, one inch in six minutes; two inches in twenty minutes, and four inches in a little more than an hour. A glance shows how much water remains in the reservoir, so that a minimum of care and attention are required to keep the plants in the best condition.

Asbestos is an ideal carrier of water from a body of free water to supply capillary water to soil in a plant box. It is not an organic substance like sponge, which is subject to decay, but it is a mineral substance more enduring than metal itself.

In growing plants the natural soil, especially prepared potting soil, may contain nematoid worms, insect larvæ, parasitic fungi, bacteria and weed seeds, hurtful to the plants it is desired to grow.

Also it may be desired in experimental work, as with the nodule organism of leguminous plants, to destroy certain organisms naturally present in the soil previous to inoculating the same soil with known pure cultures.

Using my plant box it is possible to prepare the soil ready for planting and then submit it with the containing box to flowing steam in a steam chest or else to steam under pressure. The steam does not in any way alter the nature or absorbent quality of the asbestos, whereas sponge is soon destroyed by streaming steam and is at once destroyed by steam under pressure and loses all its absorptive power.

While the device is shown as a unitary structure, it will be understood that it may to advantage be employed as a lining for wooden boxes, in which case an opening will be provided in the ends of the wooden box by which communication may be had with the space beneath the bridge wall. It is also obvious that other modifications may be made and such changes as are within the scope of the appended claims are considered to be within the spirit of my invention.

I claim:

1. In a device of the class described, the combination of a container having a bottom wall and a bridge wall located above the bottom wall and providing a water-receiving space therebeneath, a sheet of material having capillary capacity lying against the under surface of said bridge wall, portions of said sheet projecting downwardly into said water-receiving space, said bridge wall being provided with a plurality of spaced apertures whereby water which is elevated by said sheet may be absorbed by soil supported by said bridge wall, substantially as described.

2. In a plant box, the combination with the box, of a perforated false bottom therefor, the space beneath the false bottom being adapted to contain water, and a sheet of asbestos held against the under surface of said false bottom, marginal portions of said sheet depending into the water-receiving space, said box being provided with a lateral opening beneath said false bottom whereby water may be supplied to the space, substantially as described.

3. In a plant box, the combination with the box, of a bridge wall located near the bottom thereof, said bridge wall comprising an apertured plate having a plurality of its marginal edges bent downwardly to act as supports for said bridge wall, and a sheet of material having capillary capacity, said sheet underlying the horizontal portion of the bridge wall and having depending marginal portions adapted to extend into the space beneath said bridge wall and to elevate water contained in said space and permit the absorption thereof by soil supported by said bridge wall, substantially as described.

4. In a plant box, the combination with the box, of a removable intermediate wall, said wall being composed of a perforated metallic member, means for spacing the wall away from the bottom of the box, a sheet of asbestos underlying the wall and having depending marginal portions adapted to effect the transfer of water from the space beneath the wall to soil supported by the wall, substantially as described.

5. In a plant box, the combination of a bottom and vertical walls, one of said vertical walls having a slitted and offset portion adapted to provide a water-receiving opening, and an intermediate horizontal wall located at a point above said opening, said wall being apertured and adapted to support soil in said box, a sheet of material having capillary capacity being secured to the under surface of said wall and having portions depending into the space beneath said wall, substantially as described.

6. A plant box comprising in combination, vertical walls a plurality of which are provided with slitted and offset portions forming water-receiving lips, a horizontal division wall located at a point above the openings formed by said lips, said division wall being provided with a plurality of spaced perforations, and a sheet of asbestos supported beneath said division wall and having marginal portions projecting into the space beneath said wall, substantially as described.

7. In a plant box, the combination with the box, of a separable false bottom formed from a sheet of perforated metal, the margins of which are bent downward to act as supports, an intermediate sheet of material having capillary capacity, and an underlying sheet of metal adapted to securely retain said sheet of material in contact with the under surface of said perforated sheet, the sheet of material having marginal portions projecting downwardly alongside of the supporting portions of said perforated sheet, substantially as described.

8. In a plant box, the combination with the box, of a removable false bottom composed of laminated sheets of metal and asbestos, the asbestos sheet having marginal portions adapted to project into the space beneath the wall and the upper metal sheet being perforated to permit of the absorption of water by soil supported on said bridge wall, substantially as described.

9. A plant box having two of its vertical walls provided with lipped side openings near the bottom thereof and a removable bridge wall located at a point above the lipped openings, said bridge wall being composed of two layers of sheet metal and an intermediate layer of asbestos, the metal sheets having downturned marginal edges adapted to act as supports and said asbestos layer also having downturned marginal edges adapted to project into water contained in the space beneath said wall, substantially as described.

Signed at Chicago, Illinois, this 15th day of January, 1919.

BRONSON BARLOW.

Witness:
T. D. BUTLER.